(No Model.)
A. & H. KUMPF.
ARTIFICIAL WREATH.
No. 399,270.　　　　　　　Patented Mar. 12, 1889.
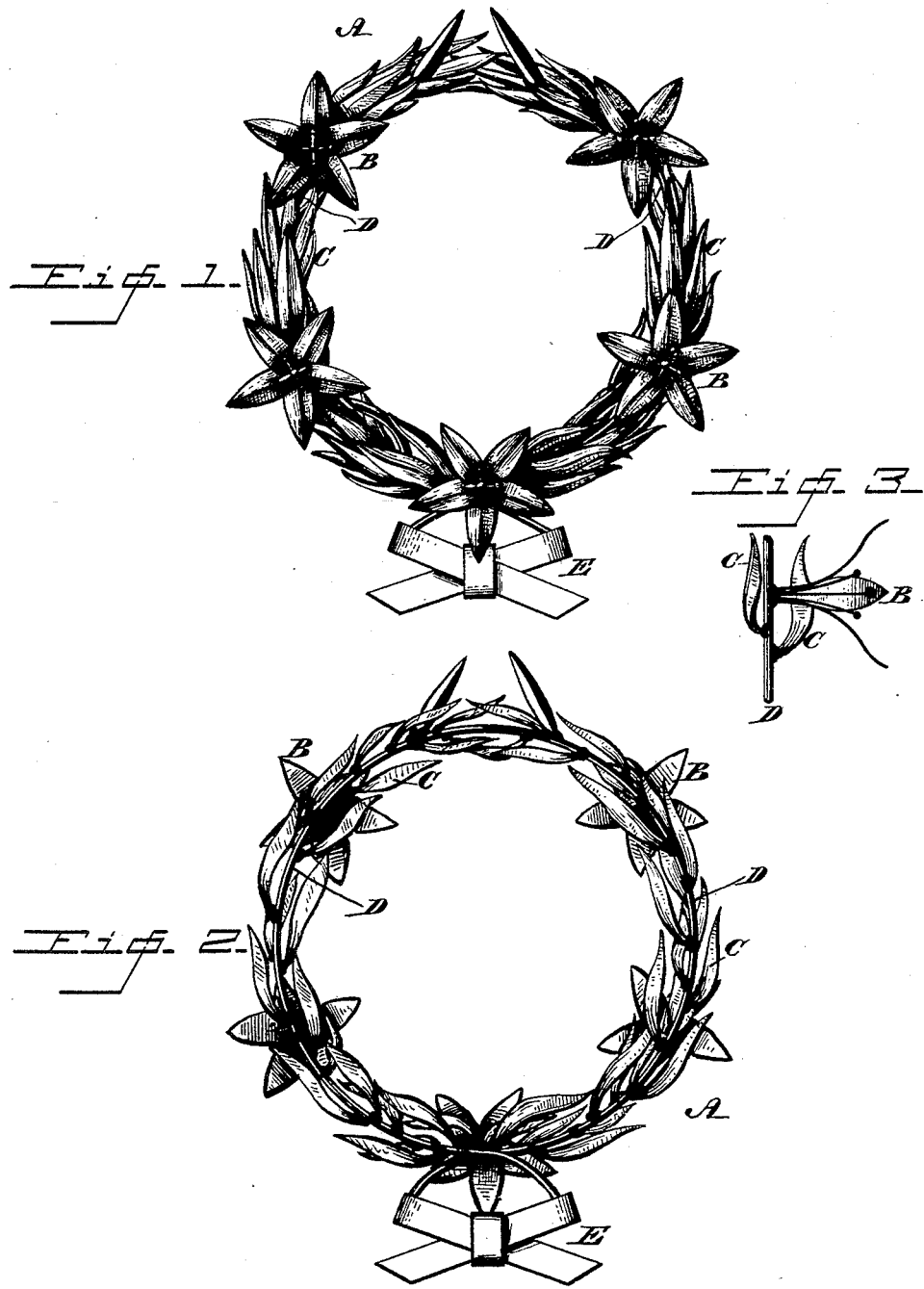

UNITED STATES PATENT OFFICE.

AUGUST KUMPF AND HENRY KUMPF, OF PHILADELPHIA, PENNSYLVANIA.

ARTIFICIAL WREATH.

SPECIFICATION forming part of Letters Patent No. 399,270, dated March 12, 1889.

Application filed January 5, 1889. Serial No. 295,533. (No model.)

*To all whom it may concern:*

Be it known that we, AUGUST KUMPF and HENRY KUMPF, citizens of the United States, residing in the city and county of Philadelphia, State of Pennsylvania, have invented a new and useful Improvement in Artificial Wreaths, which improvement is fully set forth in the following specification and accompanying drawings.

Our invention consists of an artificial wreath formed of metal, the same being attractive and comparatively imperishable, and designed more particularly to be placed on graves, all as will be hereinafter set forth.

Figures 1 and 2 represent views of opposite faces of a wreath embodying our invention. Fig. 3 represents a view of a detached portion thereof.

Similar letters of reference indicate corresponding parts in the several figures.

Referring to the drawings, A designates a wreath consisting of flowers B and leaves C, which are soldered to a backing, D, of wire, the latter presenting the appearance of the stem of a vine. The flowers and leaves are formed of sheet metal—preferably tin—cut, struck up, and bent into shape and painted in imitation of the natural article, whereby they present an attractive appearance, and are protected from the injurious effects of the atmosphere. The connection of the flowers, &c., with the backing is by solder, as has been stated, whereby they are firmly secured in position and prevented from dropping therefrom. The wire is crossed near its ends, and to said ends is connected an ornament, E, in imitation of a bow of ribbon, the same being formed of sheet metal cut into shape, bent, and painted, whereby the same is protectively coated, and is strong and durable, and the backing is prevented from opening.

Having thus described our invention, what we claim as new, and desire to secure by Letters Patent, is—

1. As an article of manufacture, an artificial wreath consisting of flowers and leaves formed of metal coated with paint and a backing of the form of the stem of a vine, substantially as described.

2. An artificial wreath formed of metal with the backing for the flowers having connected with its ends a bow of metal, substantially as described.

3. An artificial wreath formed of painted metallic flowers and leaves and a wire backing of the form of the vine, crossed near its ends and having said ends connected by a metallic ornament, substantially as described.

AUGUST KUMPF.
HENRY KUMPF.

Witnesses:
JOHN A. WIEDERSHEIM,
A. P. JENNINGS.